(12) United States Patent
Keil

(10) Patent No.: US 6,301,405 B1
(45) Date of Patent: Oct. 9, 2001

(54) MULTI-CHANNEL FIBER-OPTIC ROTARY JOINT

(75) Inventor: Mitchel J. Keil, Mattawan, MI (US)

(73) Assignee: The Board of Trustees of Western Michigan University, Kalamazoo, MI (US)

(*) Notice: Subject to any disclaimer, the term of this patent is extended or adjusted under 35 U.S.C. 154(b) by 0 days.

(21) Appl. No.: 09/468,052

(22) Filed: Dec. 20, 1999

(51) Int. Cl.⁷ ..................................................... G02B 6/26

(52) U.S. Cl. ................................ 385/25; 385/26; 359/900

(58) Field of Search .................................. 385/25, 26, 34; 359/900

(56) References Cited

U.S. PATENT DOCUMENTS 5,271,076  12/1993  Ames.
5,442,721 * 8/1995  Ames ..................................... 385/26

* cited by examiner

Primary Examiner—Darren Schuberg
Assistant Examiner—Fayez Assaf
(74) Attorney, Agent, or Firm—Flynn, Thiel, Boutell & Tanis, P.C.

(57) ABSTRACT

A multi-channel fiber-optic rotary joint having an elongate housing with a passageway extending therethrough. Fiber optic containing bundles are oriented in hollow shafts at the opposite ends of the passageway, which hollow shafts are rotatively supported in the housing. An alignment mechanism is provided inside the housing for effecting an optimizing of signal strength of signals transmitted between the respective fiber optic bundles.

7 Claims, 4 Drawing Sheets

Gear (fixed rotation center) 17, 24

Lateral load forces floating gear teeth into the teeth of both fixed gears

Gear (floating rotation center) 74, 82

Gear (fixed rotation center) 69, 73

Pitch circle for gear 17, 24

Pitch circle contact tangent

Pitch circle for gear 74, 82

Pitch circle contact tangent

Pitch circle for gear 69, 73

MULTI-CHANNEL FIBER-OPTIC ROTARY JOINT

This invention relates a multi-channel fiber-optic rotary joint and, more particularly, to a rotary joint, as aforesaid, wherein an adjustment mechanism is provided for optimizing the signal strength transmitted through the rotary joint from one set of fiber strands in a bundle to another set of fiber strands in a separate bundle disposed axially from the first mentioned bundle.

BACKGROUND OF THE INVENTION

Multi-channel fiber-optic rotary joints are known in the art and one example thereof is described in U.S. Pat. No. 5,271,076. As is explained in this patent, the extreme tolerances associated with multi-channel rotary joints exhibit high optical loss and variation of that loss with rotation.

Accordingly, it is an object of this invention to provide a multi-channel fiber-optic rotary joint which is capable of effecting an optimization of signal strength through the rotary joint and rendering the signal strength essentially constant during rotation of one end of the rotary joint with respect to the other end.

It is a further object of the invention to provide a multi-channel fiber-optic rotary joint, as aforesaid, which facilitates a setting of the alignment for a central one of the fiber strands before facilitating alignment of the strands that are oriented radially outwardly therefrom. It is a further object of the invention to provide a multi-channel fiber-optic rotary joint wherein the respective ends of the joints are supported for rotation and when adjustment is needed, the two ends are rotatively linked to facilitate rotation in opposite directions to bring the outer fiber optic strands into an optimal signal strength relation.

SUMMARY OF THE INVENTION

Other objects and purposes of this invention will be apparent to persons acquainted with apparatus of this general type upon reading the following specification and inspecting the accompanying drawings, in which:

FIG. 1 is an isometric view of a multi-channel fiber-optic rotary joint embodying the invention;

FIG. 2 a fragmentary isometric view of a fragment of the aforesaid rotary joint;

DETAILED DESCRIPTION

Figure 1:
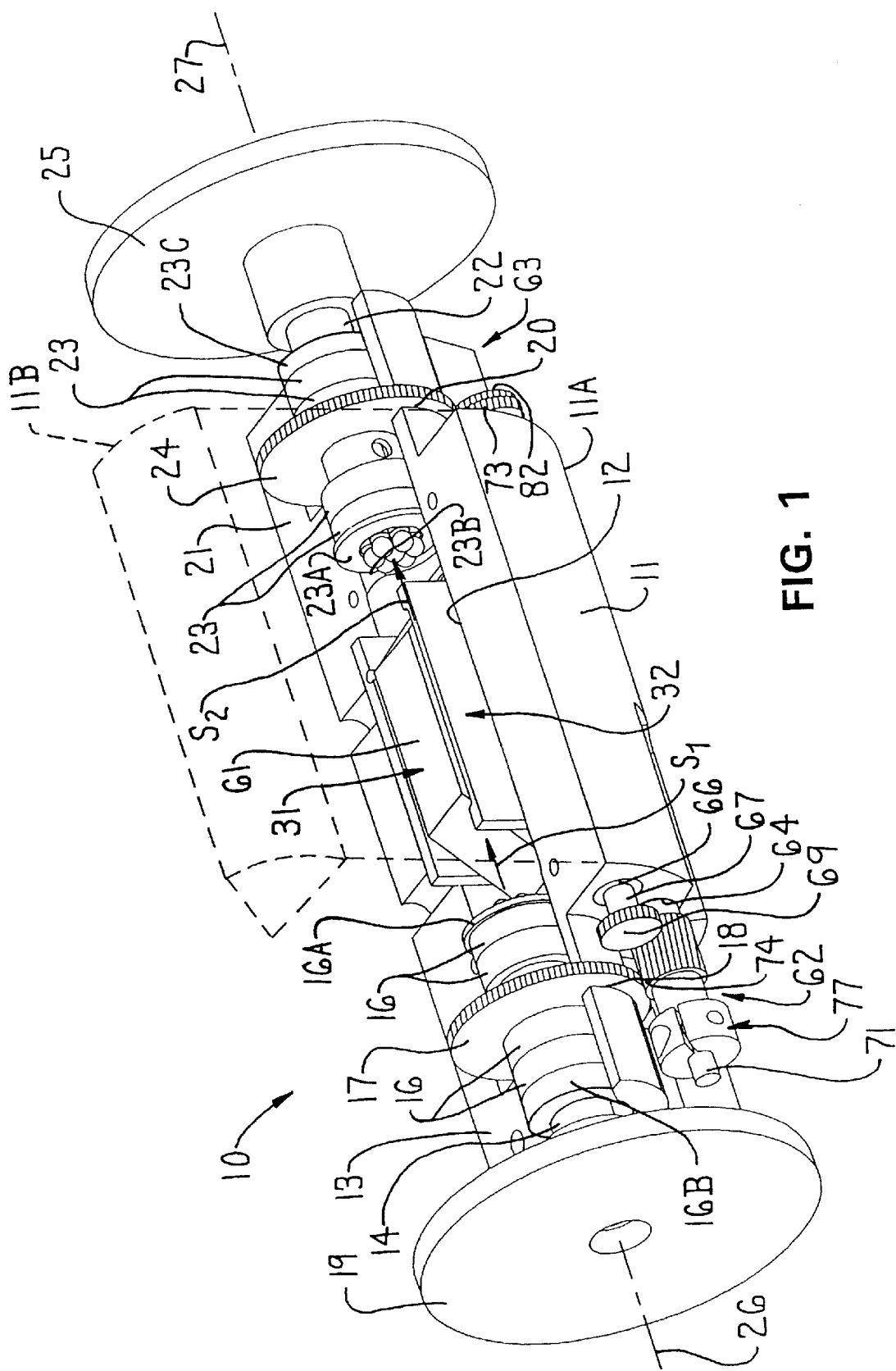

Certain terminology will be used in the following description for convenience and reference only and will not be limiting. The words "up", "down", "right" and "left" will designate corrections in the drawings to which reference is made. The words "in" and "out" will refer to directions toward and away from, respectively, the geometric center of the device and designated parts thereof. Such terminology will include derivatives and words of similar import.

A multi-channel fiber-optic rotary joint 10 is illustrated in FIG. 1. It includes a housing 11 having an elongate passageway 12 extending axially therethrough. The housing 11 consists of two housing parts 11A and 11B that are coupled together by a plurality of screws (not illustrated). When the housing parts 11A and 11B are assembled, a cylindrical housing is defined with an axially extending passageway 12 extending therethrough.

The left end of the housing illustrated in FIG. 1 includes a support section 13 for rotatably supporting a hollow shaft 14 in plural coaxially oriented bearings 16. A spur gear 17 is oriented between the bearing sets 16 as illustrated in FIG. 1 and projects through a gap 18 in the support section 13. The left end of the hollow shaft 14 terminates in a radial flange 19, which flange can be used for securing the hollow shaft 14 to either a fixed or rotatable member not illustrated.

The right end of the housing 11 includes a support section 21 rotatably supporting a hollow shaft 22 on sets of bearings 23 supported on the support section 21. A spur gear 24 identical in size and having an equal number of teeth as the spur gear 17 is mounted on the hollow shaft 22 and oriented between the sets of bearings 23 as illustrated in FIG. 1. The axis of rotation 26 of the hollow shaft 14 is coaxial with the axis of rotation 27 of the hollow shaft 22. A radial flange 25 is mounted on the hollow shaft 22 in a manner similar to the radial flange 19 on the hollow shaft 14. As with the radial flange 19, the radial flange 25 also provides facilitation of a mounting to either a fixed or rotatable member.

As shown in FIG. 1, the leftmost bearing 23 has a radially outwardly extending flange 23A which is received in a groove 23B in the support section 21. A load ring 23C is threadedly engaged with the support section 21 immediately to the right of the rightmost bearing 23 and, when turned, effects an application of an axial force on the rightmost bearing and directed toward the radial flange 23A to compress the bearings 23 and the hub for the spur gear 24 therebetween. This axially applied force also removes any unwanted radial play or clearance in the bearings 23 so as to keep the position of the axis of the shaft 22 from varying in the support structure 13.

A similar construction exists for the bearings 16. Here, the rightmost bearing 16 has a radially outwardly extending flange 16A thereon received in a not illustrated groove in the support section 13, which is similar to the groove 23B in the support section 21. A load ring 16B is threadedly secured to the support section 13 to effect, when turned, an application of an axial force toward the radial flange 16A to compress the bearings 16 and the hub for the spur gear 17 therebetween to accomplish the same objective as was done with the bearings 23.

Figure 6:
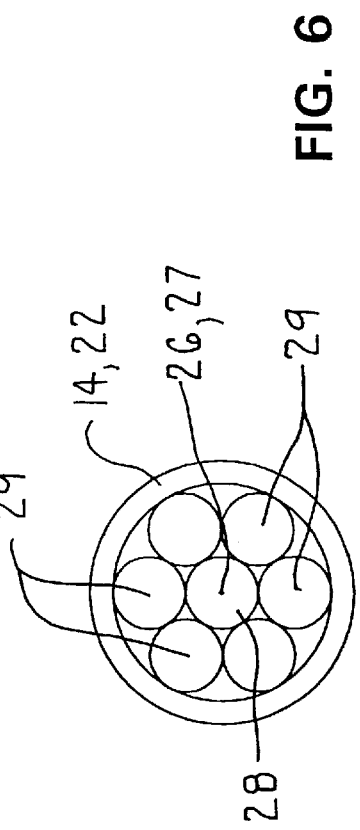
FIG. 6 is an end view of a hollow shaft containing a plurality of fiber optic strands therein.

A plurality of fiber optic strands 28 and 29 forming a bundle 30 are oriented in each of the hollow shafts 14 and 22. In this particular embodiment, the central fiber optic strand 28 of the fiber optic bundle 30 in each of the hollow shafts 14 and 22 is oriented centrally of the hollow shaft whereas the remaining, here six, fiber optic strands 29 are oriented circumferentially thereof as illustrated in FIG. 6. Thus, there are present in the disclosed invention a 7-channel rotary joint, each channel being designated by a single fiber optic strand.

Figure 4:
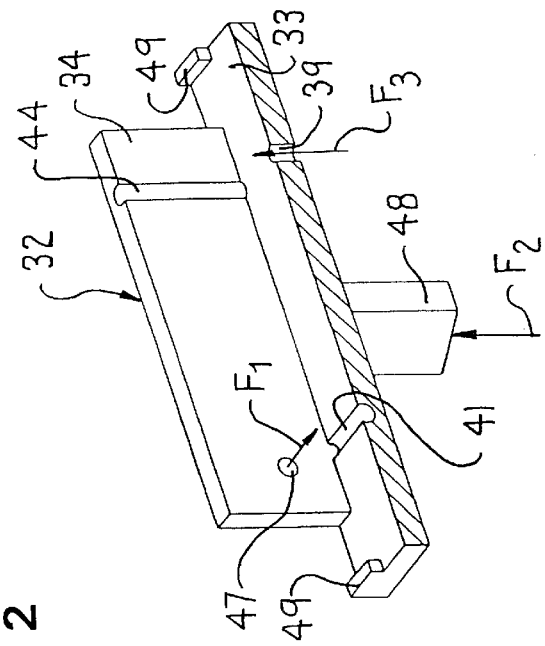
FIG. 4 is a isometric sectional view of the prism stage.

As is illustrated in FIG. 1, the terminal ends of the fiber optic strands 28 and 29 of the two bundles 30 in each of the hollow shafts 14 and 22 oppose one another through the passageway 12 in the housing 11. An adjustable prism apparatus 31 is oriented in the signal path transitioning between the terminal ends of the fiber optic strands 28 and 29 in both bundles. The adjustable prism apparatus 31 includes a prism stage 32 best illustrated in FIGS. 2–4. The prism stage 32 includes an elongated base wall 33 and a pair of upstanding and parallel sidewalls 34 and 36 upstanding from the lateral edges of the base wall 33. The sidewall 36 has a reduced thickness section 37 in which is housed a leaf spring 38 bowing inwardly into the lateral space between the sidewalls 34 and 36. As is illustrated in FIG. 4, the bottom wall 33 has an opening 39 in generally the central region thereof adjacent the right end. The bottom wall also includes a laterally extending groove 41 adjacent the left end. The groove 41 opens through the bottom portion of the sidewall 36 as at 42. A pin 43 is received into the opening 42 and the groove 41 so that the upper surface thereof projects above the surface of the bottom wall 33 as illustrated in FIG. 3.

Figure 2:
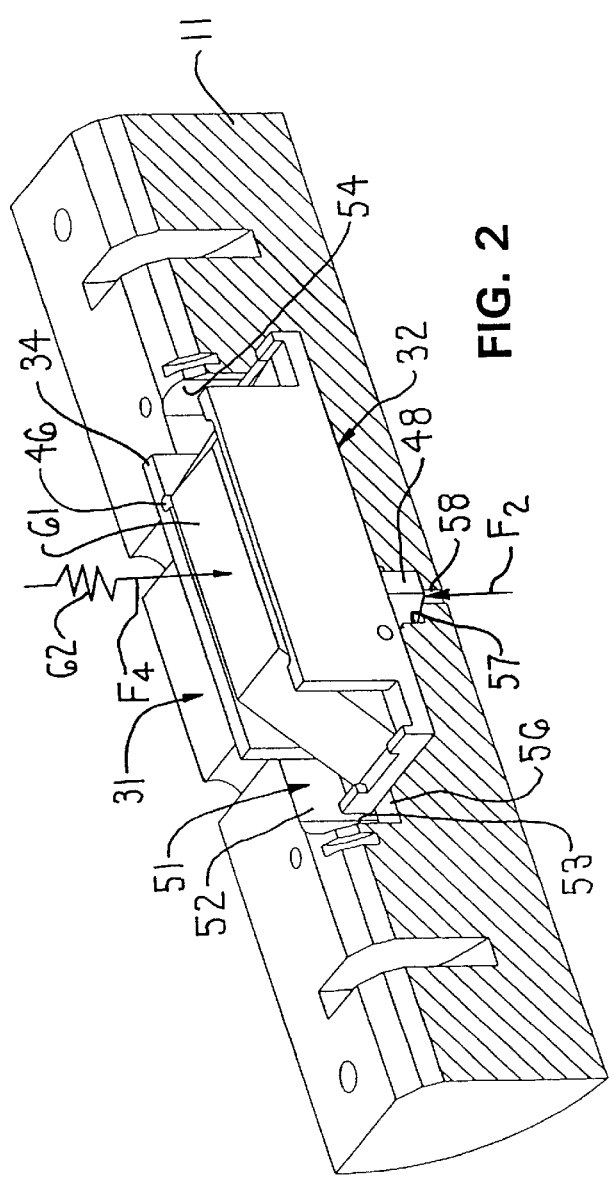
Figure 3:
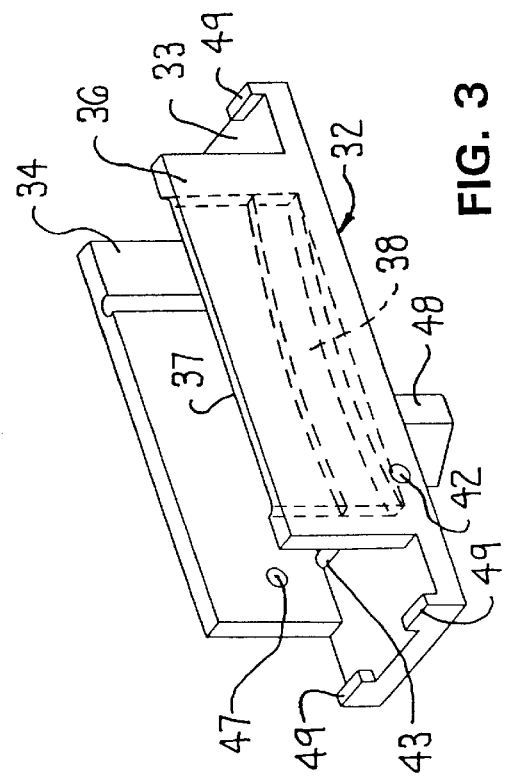
FIG. 3 is an isometric view of a prism stage.

The upstanding wall 32 has at the end thereof adjacent the hole 39 an upstanding groove 44 adapted to receive therein a pin 46 as illustrated in FIG. 2. A hole 47 is provided in the upstanding sidewall 34 adjacent the groove 41. The aforesaid holes 39 and 47 are adapted to receive a threaded set screw for applying respective forces onto the prism yet to be described.

A post 48 depends downwardly from the underside of the base wall 33. The base wall is also provided with upstanding stops adjacent the longitudinal ends thereof.

To accommodate the prism stage 32 in the housing 11, a region between the terminal ends of the fiber optic strands 28 and 29 the bundles 30 in the respective hollow shafts 14 and 22 includes a recess 51 having upstanding sidewalls, only one sidewall 52 being illustrated in FIG. 2, end walls 53 and 54 and a bottom wall 56. The bottom wall 56 includes a pocket 57, polygonal in cross section, with a hole 58 extending from the bottom wall thereof. The hole 58 is adapted to receive an externally threaded set screw.

The prism stage 32 is inserted into the recess 51 with the post 48 being slidingly received into the pocket 57. The sidewalls 34 and 36 of the prism stage 32 slidingly engage the sidewalls 52 of the recess 51. The post 48 has a polygonal cross section and corresponds to the polygonal cross section of the pocket 57 so as to prevent the prism stage from pivoting about an upright axis defined by the longitudinal axis of the post 48.

A dove prism 61 is received in the space between the sidewalls 34 and 36 of the prism stage 32 as illustrated in FIGS. 1 and 2. Dove prisms are also known as reversion prisms. The entry and exit faces are inclined and are antireflection coated. The width of the dove prism is slightly less than the spacing between the upstanding sidewalls 34 and 36 of the prism stage 32 so that the spring 38 will urge the dove prism against the sidewall 34 while maintaining a small space between the sidewall of the dove prism and the sidewall 36 of the prism stage. As a result, a turning of a set screw in the hole 47 will apply a force $F_1$ to the corresponding side of the dove prism 61 to cause the dove prism 61 to pivot about a vertically upright axis defined by the pin 46. Similarly, the turning of a set screw in the hole 58 will apply a force $F_2$ to the bottom end of the post 48 to raise and lower the prism stage 32. Turning of a set screw in the hole 39 will generate a force $F_3$ on one end of the dove prism 61 to cause the dove prism 61 to tilt about the axis defined by the pin 43. A spring 62, schematically illustrated in FIG. 2 applies a downwardly directed force $F_4$ onto the top surface of the dove prism 61 so that when the respective set screws in the holes 39 and 58 are backed-off, the spring force $F_4$ will be sufficient to return the dove prism 61 to an original position thereof. Similarly, a backing off of the set screw in the hole 47 will enable the spring 38 to return the dove prism laterally to the original position thereof about the upright pivot axis defined by the pin 46. The stops 49 retain the dove prism 61 therebetween and prevent a longitudinal shifting of the dove prism 61 relative to the housing 11.

Utilizing the adjustment features on the prism stage 32, a signal $S_1$ exiting the central fiber optic strand 28 in the hollow shaft 14 can be adjusted so that the output signal $S_2$ from the dove prism 61 will be optimized into the central fiber optic strand 28 oriented in the hollow shaft 22. Once this has been accomplished, the signal strength from the outer fiber optic strands 29 oriented in the hollow shaft 14 now need to be optimized into the fiber optic strands 29 oriented in the hollow shaft 22. The following structure accomplishes that objective.

As is illustrated in FIG. 1, the thickness of the wall of the housing part 11A is reduced as at 62 and 63 so that the spur gears 17 and 24 project through their respective gaps 18, 20 into the regions 62 and 63. Three longitudinally extending holes are cut lengthwise through the wall thickness of the housing part 11A, only two of the holes 64 and 66 being illustrated in FIG. 1. The third not illustrated hole is immediately adjacent the hole 64. All three holes open into the respective regions 62 and 63.

Figure 5:
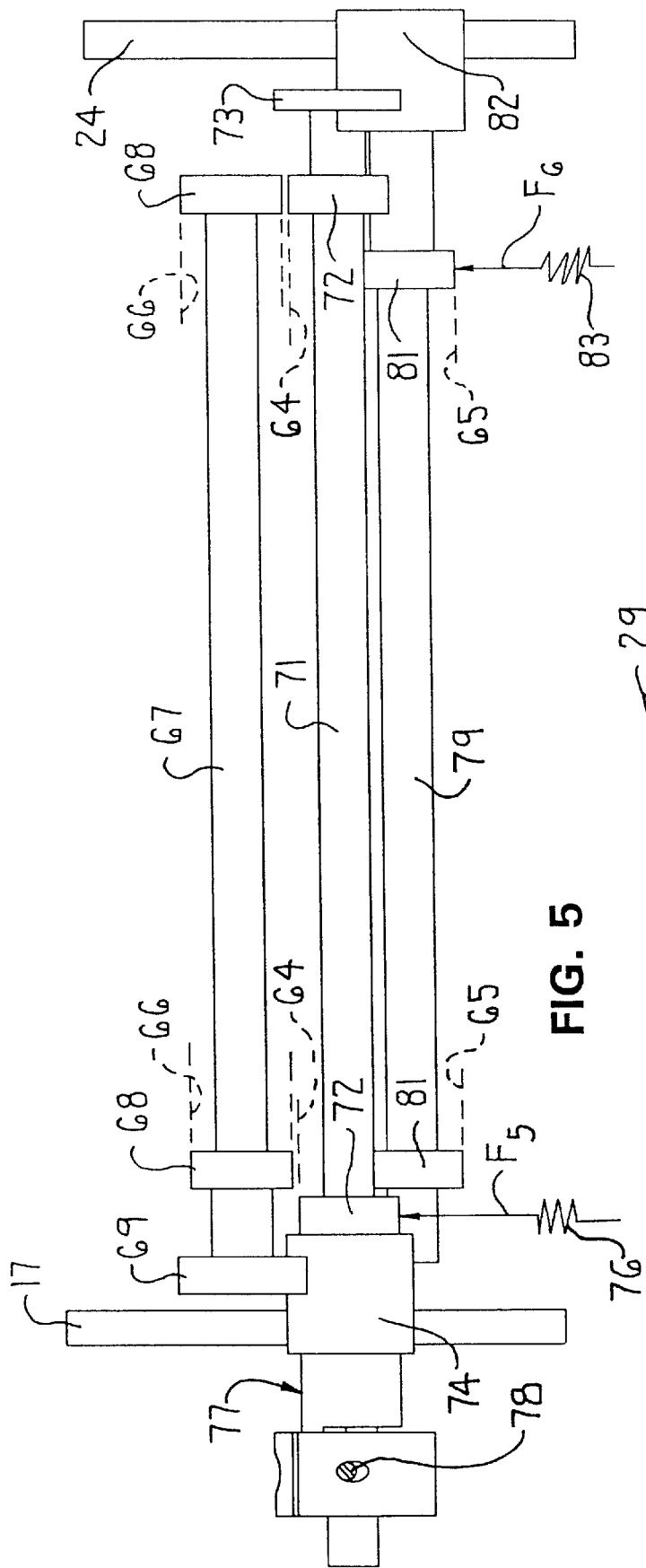
FIG. 5 is a side view of the control mechanism utilized for rotatively linking the respective ends of the rotary joint.

Turning now to FIG. 5, the hole 66 receives therein an elongate shaft 67 rotatably supported on spaced bearings 68. A spur gear 69 is secured to the end of the shaft 67 adjacent the exposed portion of the spur gear 17 projecting through the gap 18.

An elongate shaft 71 is received into the hole 64 and is rotatably supported thereon by axially spaced bearings 72. A spur gear 73 identical to the spur gear 69 is secured to the right end of the shaft 71 and is oriented adjacent the exposed portion of the spur gear 24 projecting through the gap 20. A spus gear 74 secured to the end of the shaft 71 adjacent both of the spur gears 17 and 69 and has a sufficient width to enable the teeth thereof to mesh with the teeth of the spur gears 17 and 69. A spring 76, schematically illustrated in FIG. 5, applies a force $F_5$ on the bearing 72 to urge the spur gear 74 into tight engagement with the teeth on both of the spur gears 17 and 69 so as to eliminate any backlash that might be present therebetween.

A unique feature of the gear 74 is that it is secured to a collet mechanism 77 which supports the gear 74 for rotation with respect to the shaft 71. The gear 74 can be rendered fixed to the shaft 71 by tightening the screw 78 on the collet mechanism 77. In other words, a loosening of the screw 78 will enable the collet to slip with respect to the shaft 71 thereby enabling the gear 74 to freely rotate with respect to the shaft 71.

An elongate shaft 79 is received into the hole 65 o (FIG. 5), namely, that hole which is behind the shaft 64 illustrated in FIG. 1, and is rotatably supported in the hole 65 by axially spaced bearings 81. A gear 82 identical to the gear 74 is fixedly secured to the end of the shaft 79 adjacent the exposed portion of the spur gear 24 projecting through the gap 20 and the spur gear 73. In fact, the teeth on the spur gear 82 are meshed with the teeth on the spur gears 24 and 73. A spring 83, schematically illustrated in FIG. 5, applies a force $F_6$ onto the bearing 81 adjacent the spur gear 82 so as to effect an urging of the teeth of the spur gear 82 into a tightly meshed relation with the teeth on the spur gears 24 and 73 in order to eliminate any backlash that may be present therebetween.

Figure 7:
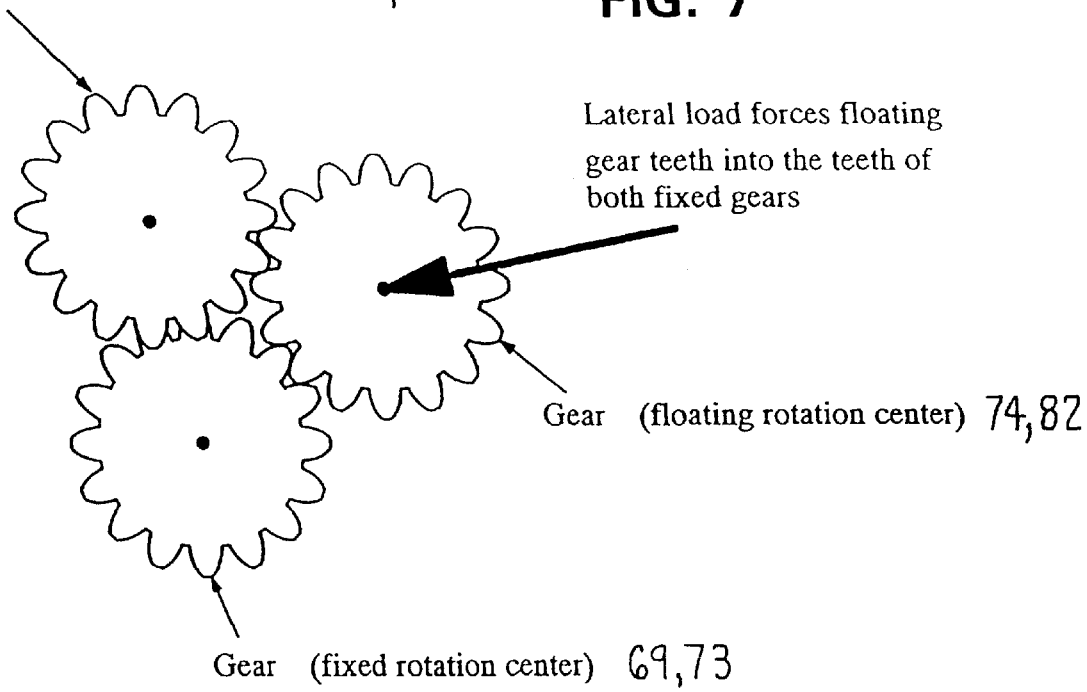
FIGS. 7 and 8 are schematic illustrations of related gear arrangements disclosed herein.

FIG. 7 shows very schematically the loading scheme for achieving an antibacklash condition for all three gears. This loading scheme applies to gears of differing diameters as long as the pitch of the teeth is the same. Note that gears 17, 24 and 69, 73 are not in the same plane and do not mesh. Gears 74, 82 are long enough (into the page) to mesh with both gears 17, 24 and 69, 73. Gears 17, 24 and 69, 73 have fixed rotation centers. Thus, gears 74, 82 cannot have a fixed rotation center since small eccentricities in manufacture would cause very high stresses in the gear teeth that would cause high friction, yield in the metal tooth face, or both. The gears and their respective shafts are simply too rigid to allow for even small eccentricities in the gears.

A lateral load is supplied by a spring which is designed to be compliant enough not to yield while supplying enough load to maintain two tooth contact between gears 17, 24 and gears 74, 82 and gears 69, 73 and gears 74, 82.

Figure 8:
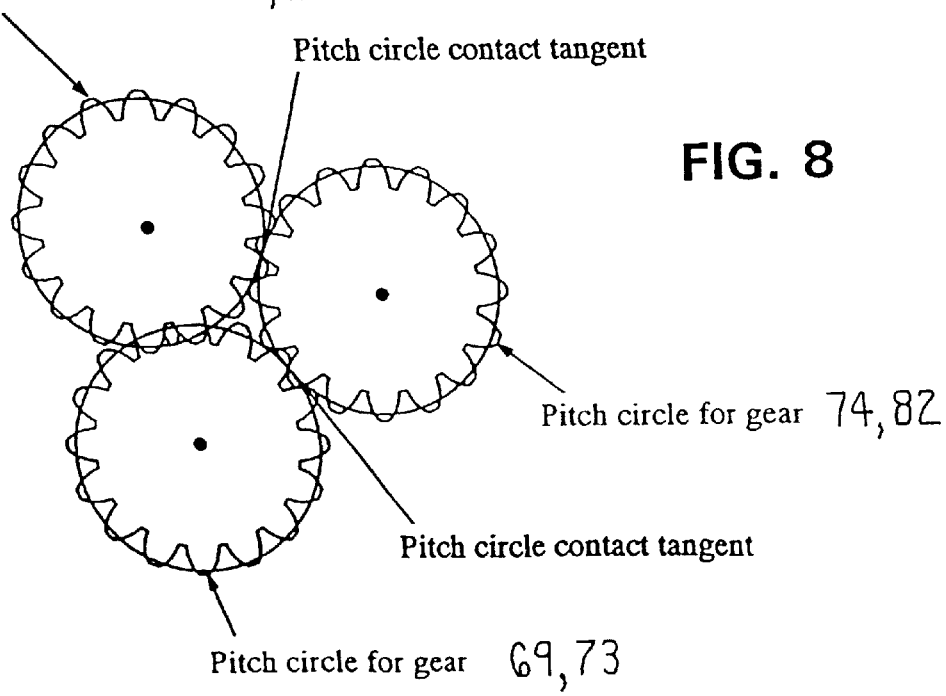

FIG. 8 shows the effect of this arrangement. The pitch circle of gears 74, 82 rides in the v-angle formed by the two tangent lines of contact. Traditionally, antibacklash is achieved by using two gears in a scissors arrangement, but this type of antibacklash device cannot maintain the antibacklash effect between two gears simultaneously. The device presented here can. It also has an advantage in that the spring used to provide the lateral load can be designed independently of the gear set. Thus, the spring load can be corrected to an appropriate setting without starting from scratch on the gear set.

Since the adjustable prism apparatus 31 described above has facilitated an optimization of the signal strength transfer between the central fiber optic strand 28 in the fiber optic bundle 30 oriented in the hollow shaft 14 to or from the central fiber optic strand 28 in the fiber optic bundle 30 oriented in the hollow shaft 22, the next adjustment that needs to occur is an optimization of the signal strength transfer between the outer fiber optic strands 29 in both bundles. This adjustment is accomplished in the following manner. The screw 78 is loosened so that the collet mechanism 77 facilitates the free rotation of the spur gear 74 relative to the shaft 71. As a result, the spur gear 24 can now be rotated relative to the spur gear 17 until signal strength optimization occurs with the outer fiber optic strands 29. Once signal strength optimization has occurred, the screw 78 is again tightened to lock the spur gear 74 to the shaft 71. Any relative rotative movement between the hollow shafts 14 and 22 will not negatively affect the aforesaid obtained signal strength optimization. Thus, if the radial flange 25 is secured to a rotating object and the flange 19 is secured to a fixed object, data can be effectively transmitted from the respective fiber optic bundles without any loss of signal optimization. During a relative rotation between the respective radial flanges 19 and 25, it is to be understood that the housing 11 is also rotating about the axes 26 and 27. This rotation of the housing 11 is caused by the spur gear 24 rotating relative to the spur gear 17 to cause the spur gears 82 and 73 to transmit a rotative force through the shaft 71 to the spur gear 74 to the teeth on the fixed spur gear 17. As a result, the rotating spur gear 74 will effect a rotative drive of the housing 11 in a direction of rotation that is the same as that of the spur gear 24 but half as fast.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A multi-channel fiber-optic rotary joint, comprising:
   an elongate housing having a passageway extending axially therethrough;
   a first hollow shaft rotatably supported in said passageway and at a first end thereof;
   a second hollow shaft rotatably supported in said passageway and at a second end thereof, a first axis of rotation for said first hollow shaft being coaxial with a second axis of rotation of said second hollow shaft;
   a first bundle of plural fiber optic strands mounted in said first hollow shaft and being movable therewith, said first bundle having first terminal ends oriented in said housing and facing said second hollow shaft and including a single central first fiber strand whose central longitudinal axis is coaxial with said first axis of rotation, and plural second fiber strands oriented peripherally about said first fiber strand;
   a second bundle of plural fiber optic strands mounted in said second hollow shaft and being movable therewith and having second terminal ends oriented in said housing and facing said first terminal ends, said second bundle being configured identical to said first bundle, a central longitudinal axis of a first fiber strand of said second bundle being coaxial with said second axis of rotation;
   alignment means for optimizing signal strength of signals transmitted between said respective fiber optic strands in said first and second bundles, said alignment means including an elongate dove prism oriented between said first and second terminal ends and having a longitudinal axis oriented generally coaxial with said first and second axes of rotation and means for optimizing signal strength in said first fiber strands of said first and second bundles, said alignment means further including a control means for counter-rotatively linking said first and second hollow shafts and said respective first and second bundles oriented therein for optimizing signal strength in said plural second fiber strands in said first and second bundles.

2. The multi-channel fiber-optic rotary joint according to claim 1, wherein said control means includes a first gear fixed to said first hollow shaft, a second gear fixed to said second hollow shaft and an elongate shaft rotatably supported on said housing and having a third gear fixed thereto and rotatable therewith and engaged with a rotatingly supported fourth gear engaged with said second gear, a fifth gear rotatably supported on said elongate shaft and engaged with said first gear, and selective locking means for selectively locking and unlocking said fifth gear to said elongate shaft.

3. The multi-channel fiber-optic rotary joint according to claim 2, wherein when said selective locking means is unlocked, said second hollow shaft and said second bundle therein is free to rotate about said second axis of rotation relative to said first hollow shaft and said first bundle therein to facilitate an optimizing of signal strength in said plural fiber strands in said first and second bundles.

4. The multi-channel fiber-optic rotary joint according to claim 2, wherein anti-backlash means is provided for limiting relative angular movement between said first and second gears when said selective locking means is locked.

5. The multi-channel fiber-optic rotary joint according to claim 4, wherein said control means includes a rotatably supported sixth gear engaged to said first gear.

6. The multi-channel fiber-optic rotary joint according to claim 5, wherein anti-backlash means further includes said fourth gear and said fifth gear being floatingly supported to accommodate manufacturing tolerance variations in said first, second, third and sixth gears.

7. The multi-channel fiber-optic rotary joint according to claim 1, wherein said means for optimizing signal strength in said first fiber strands includes support means for supporting said dove prism for movement relative to said housing in three orthogonally related directions and for a tilting movement about an axis oriented orthogonally to said longitudinal axes of said prism.

* * * * *